H. G. BULKLEY.
Grain Drier.
No. 267.
Reissued June 27, 1854.
Fig: 2. A. a.
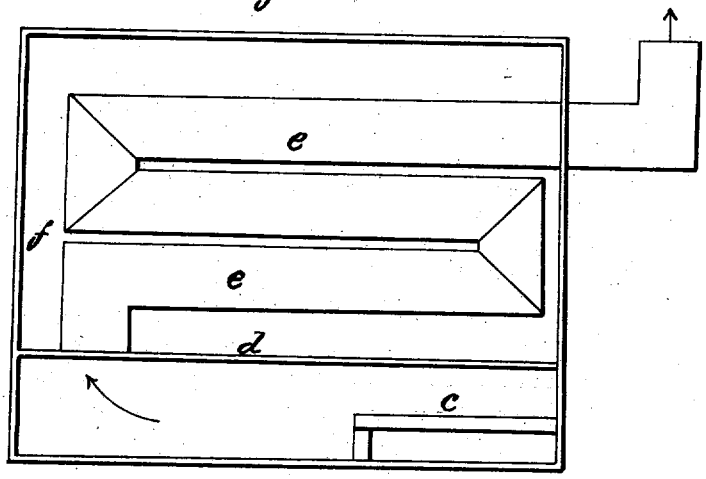
Fig: 1.
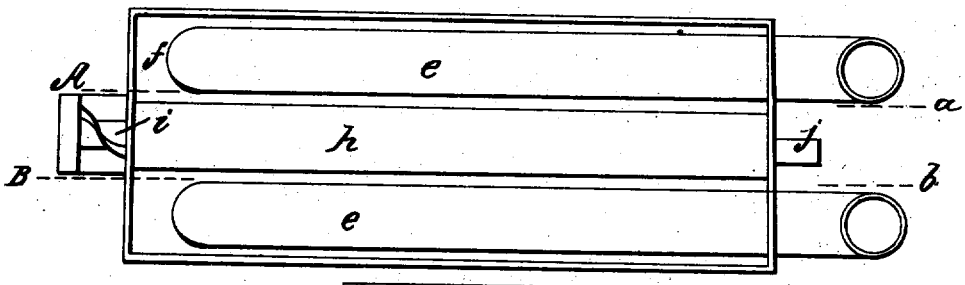
Fig: 3. B. b.
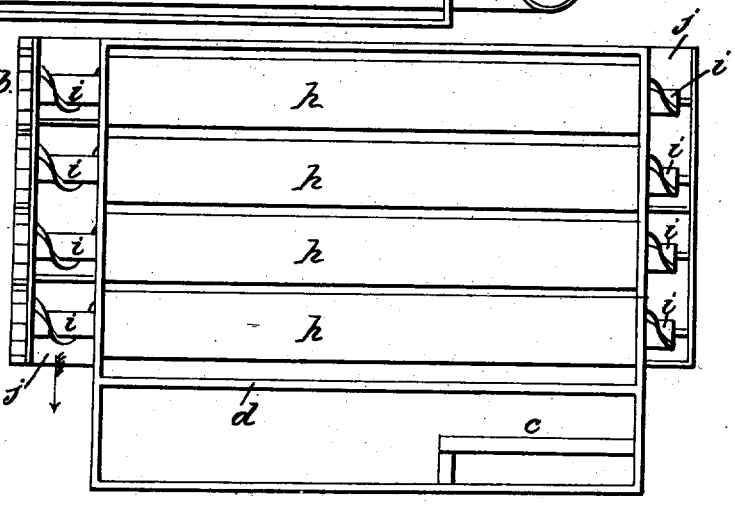
N. PETERS, Photo-Lithographer, Washington, D. C.

UNITED STATES PATENT OFFICE.

HENRY G. BULKLEY, OF KALAMAZOO, MICHIGAN.

IMPROVEMENT IN DRYING GRAIN.

Specification forming part of Letters Patent No. 8,769, dated March 2, 1852; Reissue No. 267, dated June 27, 1854.

*To all whom it may concern:*

Be it known that I, HENRY G. BULKLEY, of Kalamazoo, Michigan, have invented certain Improvements in the Method of Drying Grain, Lumber, and other Vegetable Substances, of which the following is a full, clear, and exact description, reference being had to the accompanying drawings, making part of this specification, in which—

Figure 1 is a plan of the apparatus; Fig. 2, a vertical section in the plane A *a;* and Fig. 3 another section taken in the plane B *b* of Fig. 1.

The object of my invention is to kiln-dry or season grain, flour, meal, lumber, or other vegetable substances, with a view to extract the sap or other moisture, and thereby enable them the better to resist the decaying influence of the atmosphere, and to effect this purpose more economically and without the danger of scorching, as when such substances are exposed to the action of highly-heated atmospheric air, and without the danger of explosion, as when such substances are exposed to the action of high tension.

I have discovered that steam in a vessel opened to the atmosphere can be employed as a medium of transmitting caloric to vegetable substances for seasoning them, called "kiln-drying," so that whether in contact with this medium or with metals heated thereby all danger of scorching will be avoided, while at the same time the seasoning or kiln-drying is effected more economically than by any other known method, and all danger of exploding the vessel or apparatus is avoided.

My invention consists in seasoning or kiln-drying substances by the employment of steam in a chamber opened to the atmosphere as a means of transmitting caloric to such substances or the vessel or vessels containing them, the steam-chamber being opened to the atmosphere to prevent an excess of pressure.

The following is a description of the apparatus which I have employed with success in kiln-drying grain, flour, meal, &c.:

I make a box of any desirable size, of wood, brick, or other suitable material, and of suitable proportions—say eight feet long, two feet four inches wide, and three feet six inches high, (more or less.) The bottom of this chamber must be formed of sheet metal, which also extends up the sides to a sufficient distance to form a shallow pan, *d*. Beneath this pan or bottom there is formed in any ordinary way a fire-chamber, as shown at *e*, from which two smoke-pipes, *e*, rise, passing up on either side of the chambers of the articles to be dried, and made so as to traverse the steam-chamber *f* three or more times its length, after which it is conveyed off into the chimney or otherwise. The pan *d* above named is filled with water to the depth of six or more inches, through which the smoke-pipes enter the chamber.

Through the center of the box or chamber *f* above named there is a series of horizontal tubes, *h*, which pass clear through the box, and project out at either end, if grain or meal, &c., is to be dried, which have a heating-tube on either side. These grain-tubes are all in the same vertical plane, and the grain is put into one end of the upper tube of the series, from whence it is conveyed through the box to the opposite end by means of a revolving screw-conveyer, *i*, and emerges at the opposite end of the tube, whence it falls into the receiver *j* at the end of the second tube, and passes back again to the opposite end and again drops into the receiver of the third tube, and so on through the series.

The conveyers *i* are driven by any convenient power, the whole being geared together, and the velocity being regulated at pleasure, and thus any desirable per cent. of the moisture may be extracted with the same fire.

To increase the power of the machine, multiply the number of tubes, or increase their length, or both. When built to be used in a mill or warehouse, it (the box) should be constructed of brick or stone and the top arched, which will make it safer from fire than a common stove, since the smoke and heat are required to pass a considerable length and turn several elbows in the chamber containing the steam. An aperture should be made in some part of the steam-chamber near the bottom, so that the steam shall not much exceed the pressure of the atmosphere.

In making the drier for lumber, I make a double-box, of wood, of the size to hold two to four thousand feet, and fill the spaces between the two with sawdust, tan-bark, charcoal, or some other non-conducting substance. The sheet-iron pan is placed in an arch under the middle of the box. The smoke and heat pass through the sheet-iron bottom or pan (as in the grain-drier) into the box, and are then conducted a sufficient number of times the length of the box near the bottom. The ends of the steam-box may be provided with doors, so that a car may be loaded with lumber and by means of a track run into the steam-box, and the whole steamed until the sap is removed, and while very hot should be run out at the other end and another car run into the steam-box. By this process no time is lost, and the lumber is removed while there is internal heat sufficient to prevent moisture by condensation of steam. There is no necessity of going into the hot-steam chamber to remove the lumber. The lumber on the car should be raised a sufficient distance above the heating-pipes to prevent its being scorched.

From the foregoing it will be seen that the steam generated from the water in the pan pervades the entire chamber, and either envelops the substances to be seasoned or the vessels containing them, and as the flues from the fire-chamber pass through the steam-chamber the steam contained therein will be superheated, or "surcharged," as it is sometimes termed, and an increase of pressure is prevented by reason of the aperture in the steam-chamber, and near the bottom thereof, or otherwise, which permits any pressure above that of the atmosphere to escape. In this way the steam becomes a medium through which the caloric is communicated to the substances to be treated, and at the same time not only gages the temperature, but acts as a protector against the scorching action of the same.

What I claim as my invention, and desire to secure by Letters Patent, is—

The method of seasoning or kiln-drying substances by using steam in a vessel which has an opening communicating with the atmosphere to limit the pressure, for the purpose of transmitting caloric to the substances to be seasoned or kiln-dried, or the vessel or vessels containing them, substantially as specified.

HENRY G. BULKLEY.

Witnesses:
L. SLATER,
F. W. WILLCOX.